(12) United States Patent
Dabich, II et al.

(10) Patent No.: US 11,560,328 B2
(45) Date of Patent: Jan. 24, 2023

(54) ULTRA LOW MELTING GLASS FRIT AND FIBERS

(71) Applicant: Corning Incorporated, Corning, NY (US)

(72) Inventors: Leonard Charles Dabich, II, Painted Post, NY (US); Mark Alejandro Quesada, Horseheads, NY (US); Shari Elizabeth Koval, Beaver Dams, NY (US); Paul Arthur Tick, Corning, NY (US)

(73) Assignee: Corning Incorporated, Corning, NY (US)

( * ) Notice: Subject to any disclaimer, the term of this patent is extended or adjusted under 35 U.S.C. 154(b) by 223 days.

(21) Appl. No.: 15/117,954

(22) PCT Filed: Feb. 11, 2015

(86) PCT No.: PCT/US2015/015349
§ 371 (c)(1),
(2) Date: Aug. 10, 2016

(87) PCT Pub. No.: WO2015/123254
PCT Pub. Date: Aug. 20, 2015

(65) Prior Publication Data
US 2016/0347644 A1    Dec. 1, 2016

Related U.S. Application Data

(60) Provisional application No. 61/939,442, filed on Feb. 13, 2014.

(51) Int. Cl.
*C03C 8/08* (2006.01)
*C03B 37/005* (2006.01)
(Continued)

(52) U.S. Cl.
CPC ............ *C03B 37/005* (2013.01); *C03B 37/01* (2013.01); *C03B 37/055* (2013.01); *C03C 3/247* (2013.01);
(Continued)

(58) Field of Classification Search
CPC ....... C03B 37/005; C03B 37/055; C03C 8/08; C03C 3/12; C03C 3/16; C03C 3/247; C03C 8/06; C03C 13/00
(Continued)

(56) References Cited

U.S. PATENT DOCUMENTS 3,732,181 A * 5/1973 Ray et al. ................ C03C 3/19
                                                            523/307
3,904,344 A   9/1975 Maringer et al.
(Continued)

FOREIGN PATENT DOCUMENTS

GB   1572778 A       8/1980
WO   2010109218 A1   9/2010

OTHER PUBLICATIONS

International Search Report and Written Opinion of Internal Application No. PCT/US15/15349, Filed Feb. 11, 2015; dated May 18, 2015; pp. 1-18.
(Continued)

*Primary Examiner* — Matthew D Matzek
(74) *Attorney, Agent, or Firm* — Russell S. Magaziner

(57) ABSTRACT

Disclosed herein are methods for forming low melting point glass fibers comprising providing a glass feedstock comprising a low melting point glass and melt-spinning the glass feedstock to produce glass fibers, wherein the glass transition temperature of the glass fibers is less than or equal to about 120% of the glass transition temperature of the glass feedstock. The disclosure also relates to method for forming low melting point glass frit further comprising jet-milling
(Continued)

the glass fibers. Low melting point glass frit and fibers produced by the methods described above are also disclosed herein.

2 Claims, 4 Drawing Sheets

(51) Int. Cl.
    *C03B 37/05*     (2006.01)
    *C03C 3/247*     (2006.01)
    *C03C 13/00*     (2006.01)
    *C03C 8/24*     (2006.01)
    *C03B 37/01*     (2006.01)
    *C03C 8/06*     (2006.01)

(52) U.S. Cl.
    CPC ............... *C03C 8/06* (2013.01); *C03C 8/08* (2013.01); *C03C 8/24* (2013.01); *C03C 13/00* (2013.01)

(58) Field of Classification Search
    USPC .... 501/24, 25, 35–37, 151, 43–45; 428/364, 428/401, 903, 372; 442/348
    See application file for complete search history.

(56) References Cited

U.S. PATENT DOCUMENTS

| | | | | |
|---|---|---|---|---|
| 4,314,031 | A | * | 2/1982 | Sanford ............... C03C 3/247 501/901 |
| 4,731,001 | A | | 3/1988 | Yamamoto et al. |
| 5,067,554 | A | | 11/1991 | Bosswell et al. |
| 5,089,446 | A | * | 2/1992 | Cornelius ............... C03C 8/24 501/15 |
| 5,510,301 | A | * | 4/1996 | Fink ..................... C03C 3/16 501/20 |
| 6,281,151 | B1 | | 8/2001 | Tick |
| 6,617,269 | B2 | | 9/2003 | Yamanaka |
| 6,667,258 | B2 | | 12/2003 | Quinn |
| 6,831,029 | B2 | | 12/2004 | Chacon et al. |
| 7,498,283 | B2 | | 3/2009 | Nakagawa et al. |
| 7,602,121 | B2 | | 10/2009 | Aitken et al. |
| 7,722,929 | B2 | | 5/2010 | Aitken et al. |
| 7,829,147 | B2 | | 11/2010 | Aitken et al. |
| 8,304,990 | B2 | | 11/2012 | Aitken et al. |
| 8,435,604 | B2 | | 5/2013 | Aitken et al. |
| 2002/0019303 | A1 | | 2/2002 | Yamanaka |
| 2002/0128141 | A1 | | 9/2002 | Buhrmaster et al. |
| 2004/0206953 | A1 | | 10/2004 | Morena et al. |
| 2004/0207314 | A1 | | 10/2004 | Aitken et al. |
| 2006/0025513 | A1 | * | 2/2006 | Nakagawa ............... C03C 3/19 524/494 |
| 2008/0146431 | A1 | * | 6/2008 | Aitken .................... C03C 3/247 501/44 |
| 2012/0028011 | A1 | | 2/2012 | An et al. |
| 2014/0145122 | A1 | * | 5/2014 | Sawai .................... H01J 29/90 252/514 |
| 2016/0257610 | A1 | * | 9/2016 | Kodama ................ B32B 17/06 |

OTHER PUBLICATIONS

Graham et al.; Corning and the Craft of Innovation: Oxford University Press 2001; pp. 92, 234-235, 237.
EP15748961 Supplementary Search Report dated Aug. 24, 2017, European Patent Office.
Yichen et al. "Tin flourophosphate nonwovens by melt state centrifugal forcespinning" Journal of Materials Science, 49(24) 2014, pp. 8252-8260.
Yujie et al. "A Chinese-English dictionary for the classification of medical equipment and scientific instrument", China Medical Science and Technology Press, Mar. 31, 2000, pp. 796.
English Translation of CN201580008718.8 Third Office Action dated Mar. 1, 2019, China Patent Office, 8 pgs.

* cited by examiner

ULTRA LOW MELTING GLASS FRIT AND FIBERS

This application claims the benefit of priority under 35 U.S.C. § 371 of International Patent Application Serial No. PCT/US15/15349, filed on Feb. 11, 2015, which claims the benefit of priority under 35 U.S.C. § 119 of U.S. Provisional Application Ser. No. 61/939,442, filed on Feb. 13, 2014, the contents of which are relied upon and incorporated herein by reference in their entireties.

FIELD OF THE DISCLOSURE

The present disclosure relates generally to low melting point glass frit and fibers and methods for making the same.

BACKGROUND

Glass frit may be used in sealing and bonding applications, for instance, as a means to hermetically bond glass and/or ceramic materials. Exemplary applications for such hermetic seals include televisions, sensors, optical devices, organic light emitting diode (OLED) displays, and any other devices which may benefit from a hermetic environment for sustained operation, such as 3D inkjet printers, solid-state lighting sources, and photovoltaic structures.

Traditional glass frit may typically be produced by milling or grinding glass cullet to a particle size ranging from about 5 to about 30 microns. The glass particles may then be mixed with inorganic powders having a negative coefficient of thermal expansion (CTE) so as to lower the mismatch of CTE between the substrates to be bonded and the glass frit. Negative CTE powders typically used in the art may include, e.g., β-eucryptite, zirconium vanadate ($ZrV_2O_7$), and zirconium tungstate ($ZrW_2O_8$). Conventionally, glass frit and negative CTE powders are blended into a paste using an organic solvent, which acts as a binder and adjusts the rheological viscosity of the combined powders for dispensing purposes.

To join two or more substrates, the glass frit paste may be applied to one of the substrates in a pattern, such as by screen printing or controlled syringe dispensing. The thickness of the glass frit paste may vary, for example, from about 5 to about 30 microns. The patterned substrate may then be treated by (a) an organic burn-out step during which the organic vehicle is removed (e.g., heating to about 250° C. for about 30 minutes), and (b) an inorganic glazing step (e.g., heating to about 490° C. for about 10 minutes). The treated patterned substrate may be subsequently assembled with the other substrate by applying sufficient pressure to ensure good substrate contact. The assembled substrates are subsequently heated to a temperature sufficient to bond the substrates, e.g., by infrared laser or any other suitable heating means.

Glass compositions having a glass transition temperature ($T_g$) of less than about 450° C. are referred to herein as low melting point glass (LMG) compositions. It is often desirable to produce glass frit from LMG compositions for applications which benefit from lower temperature processing.

Vanadium oxide based LMGs tend to have a $T_g$ ranging from about 250° C. to about 450° C. Lead-containing LMGs may have a lower $T_g$, but these glass compositions are often less favorable for commercial application because they are not considered to be environmentally "green." Previous efforts to mill glass frit from lower melting temperature lead-free materials, such as glass phosphate LMG compositions, resulted in heavily oxidized materials that did not retain their original low melting characteristics. Without wishing to be bound by theory, it is believed that this effect is a result of the LMG's ease of oxidation and the anion (e.g., fluorine) volatility produced by the violent chemical bond breaking events associated with prior art milling processes. For example, when such LMG materials are ball milled in a nitrogen environment, it is observed that these chemically labile glass compositions exhibit oxidation and anion volatility. Certain subsets of these LMG compositions may also exhibit self-passivation resulting in surfaces that are highly refractory.

Due to the various complications described above, conventional attempts to produce LMG frits tend to be limited to particle sizes of greater than 150 microns. Commonly used approaches to produce LMG frit therefore employ either (a) lead-containing glasses or (b) higher $T_g$ glasses that are more resistant to oxidation. Accordingly, it would be advantageous to provide methods for producing glass frit or fibers that have a smaller particle size, are substantially lead-free, and/or that have a $T_g$ of less than 250° C. and/or less than about 120% of the $T_g$ of the LMG composition from which they are formed. The resulting glass frit or fiber compositions can possess low melting temperature properties while also being durable and/or environmentally desirable.

SUMMARY

The disclosure relates, in various embodiments, to methods for forming low melting point glass fibers comprising providing a glass feedstock comprising a low melting point glass and melt-spinning the glass feedstock to produce glass fibers, wherein the glass transition temperature of the glass fibers is less than or equal to about 120% of the glass transition temperature of the glass feedstock. According to various embodiments, the low melting point glass may be chosen from Tick glass compositions and eCap glass compositions and may be in the form of glass cullet. The low melting point glass may have a glass transition temperature of less than about 450° C. In certain embodiments, the low melting point glass may be substantially free of lead. Melt-spinning may be carried out, by way of non-limiting example, using ceramic lathes, high rotary tools, and/or electro-spinning devices. The glass fibers produced by the methods disclosed herein may have a strand thickness of less than about 500 microns and/or a glass transition temperature of less than about 250° C.

The disclosure also relates to method for forming low melting point glass frit comprising the steps described above and further comprising jet-milling the glass fibers to produce glass frit. In various embodiments, the jet mill may operate under inert conditions, for example, using an inert gas such as nitrogen and Noble gases, for example, argon, helium, krypton, and/or xenon. The glass frit produced by the methods disclosed herein may have an average particle size diameter of less than about 150 microns, a glass transition temperature of less than about 250° C., and/or a glass transition temperature less than or equal to about 120% of the glass transition temperature of the glass feedstock.

The low melting point glass frit and fibers produced by the methods described above are also disclosed and claimed herein. According to various embodiments, these frit and fiber compositions may be substantially free of lead and/or have a glass transition temperature of less than about 250° C.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals and in which.

DETAILED DESCRIPTION

Figure 1:
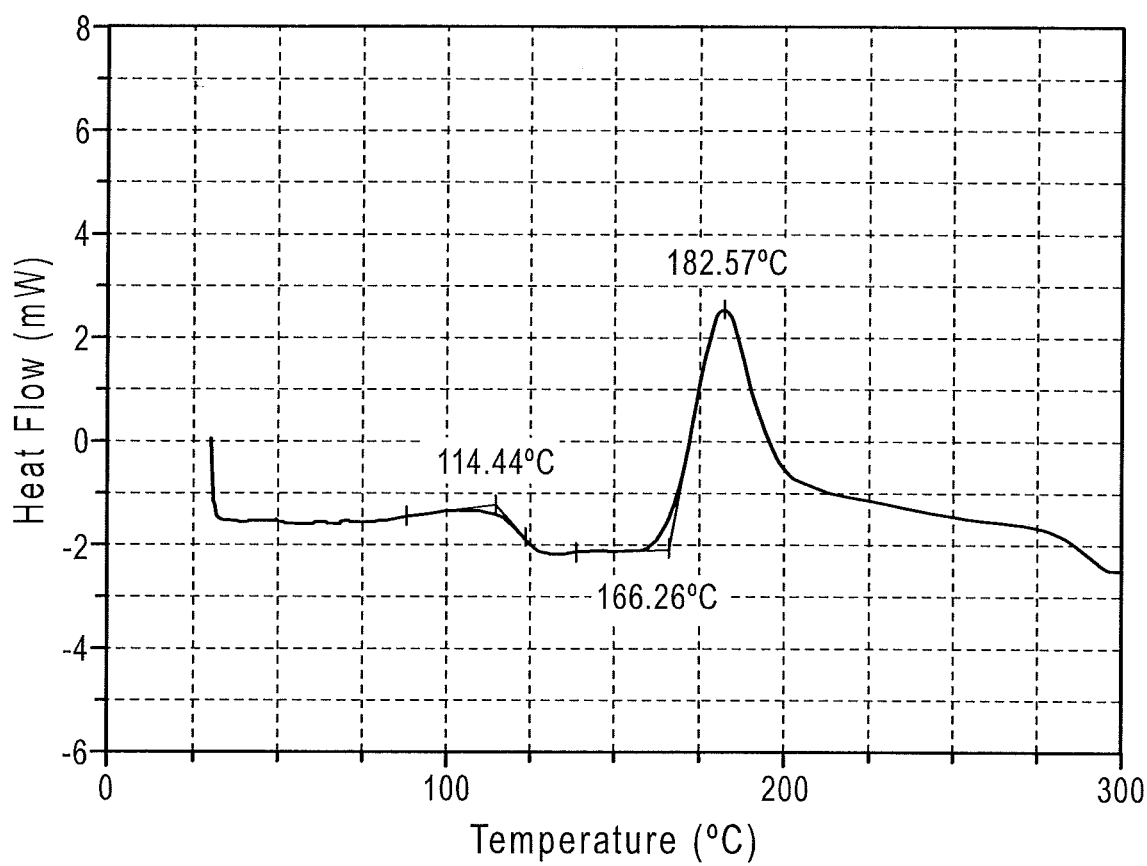
FIG. 1 illustrates the differential scanning calorimetric spectrum of LMG fibers produced from "single-melt" 870CHM glass cullet in accordance with various aspects of the disclosure.

Disclosed herein is a method for making low melting point glass fibers comprising providing a glass feedstock comprising a low melting point glass and melt-spinning the glass feedstock to produce glass fibers, wherein the glass transition temperature of the glass fibers is less than or equal to about 120% of the glass transition temperature of the glass feedstock. Also disclosed herein is a method for making low melting point glass frit comprising jet-milling the glass fibers produced by the method described above in an inert environment. Additionally disclosed herein are glass frit and fiber compositions produced by the above-described methods. Further described herein are glass fibers that are substantially lead-free, have a strand thickness of less than about 500 microns, and a $T_g$ of less than about 250° C. Still further described herein is glass frit that is substantially lead-free, has an average particle size diameter of less than about 150 microns, and a $T_g$ of less than about 250° C. Additional aspects of the disclosure are provided in more detail below.

Materials

According to various embodiments, glass feedstock may comprise any suitable LMG composition. For instance, the glass feedstock may comprise LMG cullet (e.g., broken glass pieces). The LMG composition may, in certain embodiments, be substantially free of lead. As used herein the terms "substantially free of lead" and "substantially lead-free" are intended to refer to glass compositions which contain no lead or trace amounts of lead. For instance, the glass compositions comprise at most 0.9% by weight of lead, such as less than about 100 ppm of lead, or less than about 10 ppm of lead.

The LMG compositions described herein may have a glass transition temperature ($T_g$) of less than about 450° C. In certain embodiments, the LMG composition has a $T_g$ ranging from about 100° C. to about 450° C., such as less than about 400° C., less than about 350° C., less than about 300° C., less than about 250° C., less than about 200° C., or less than about 150° C.

In other embodiments, the LMG composition may be chosen from Tick glass compositions and/or encapsulation or eCap glass compositions. Tick glasses are referred to herein as tin-phosphorus oxyfluoride glass compositions comprising from about 20% to about 85% Sn, from about 2% to about 20% P, from about 3% to about 20% O, and from about 10% to about 36% F, wherein Sn+P+O+F is at least about 75%, on an elemental weight percent basis. Tick glass compositions and methods for preparing the same are described by Tick, Paul, *Old Glass Technology Revisited*, Corning Redlines, vol. 1, no. 2, pp. 1-8 (2007), which is incorporated herein by reference in its entirety. Suitable Tick glass compositions are also described in U.S. Pat. Nos. 5,089,446 and 6,281,151, which are incorporated herein by reference in their entireties.

As used herein "eCap" glass compositions refer to a subset of LMGs that exhibit a self-passivating hermetic film which may be especially suitable, e.g., for OLED device fabrication. For example, eCap glass compositions may include $Sn^{2+}$-containing inorganic oxides comprising from about 59% to about 89% Sn, from 0% to about 13% P, from about 6% to about 25% O, and from 0% to about 12% F, on an elemental weight percent basis. In some embodiments, the eCap glasses have a composition wherein Sn+P+O+F is at least about 75% on an elemental weight percent basis. In other embodiments, the eCap glasses have a composition wherein Sn+O is at least about 75% on an elemental weight percent basis. Non-limiting examples of eCap compositions include, for instance, tin fluorophosphate glass, tungsten-doped tin fluorophosphate glass, chalcogenide glass, tellurite glass, borate glass and phosphate glass (e.g., alkali Zn or SnZn pyrophosphates). An exemplary tin fluorophosphate glass has the following composition: Sn (20-85 wt %), P (2-20 wt %), O (10-36 wt %), F (10-36 wt %), Nb (0-5 wt %) and Sn+P+O+F≥W 75% on an elemental weight percent basis. Such glass compositions are described in U.S. Pat. Nos. 7,829,147, 7,722,929, 8,435,604, and 8,304,990 which are incorporated herein by reference in their entireties.

Depending on the desired application, the glass feedstock may or may not be doped with dyes or colorants for decorative or other purposes. For example, the glass feedstock may be doped with Cerium Yag, Red Nitrate Phosphors, and similar dopants.

Exemplary glass feedstock compositions may comprise, for instance, 870CHM, 870CHP, and 870CHO glasses, available from Corning Incorporated, and similar glass compositions. By way of non-limiting example, 870CHM is an optionally niobium-doped tin fluorophosphate composition comprising from about 20% to about 85% Sn, from about 2% to about 20% P, from about 10% to about 36% O, from about 10% to about 36% F, and optionally from 0% to about 5% Nb, wherein Sn+P+O+F is at least about 75%, on an elemental weight percent basis.

The methods disclosed herein may be used to form low melting point glass fibers. The glass fibers 400 (see FIG. 4)

may, in certain embodiments, have a strand thickness of less than about 500 microns. By way of non-limiting embodiment, the glass fibers may have a strand thickness ranging from about 1 nanometer to about 500 microns, such as less than about 400 microns, less than about 300 microns, less than about 200 microns, or less than about 100 microns.

The glass fibers 400 may also exhibit a $T_g$ of less than or equal to about 120% of the $T_g$ of the glass starting material (e.g., LMG feedstock). For instance, the glass fibers 400 may exhibit a $T_g$ of less than or equal to about 115%, less than about 110%, less than about 105%, or less than about 100% of the $T_g$ of the glass starting material. In certain embodiments, the glass fibers may have a $T_g$ of less than about 250° C., for example, ranging from about 100° C. to about 250° C., such as less than about 225° C., less than about 200° C., less than about 175° C., less than about 150° C., or less than about 125° C.

According to various embodiments, the glass fibers 400 may be substantially free of lead. According to further embodiments, the glass fibers may be substantially lead-free, have a $T_g$ of less than about 250° C., and a strand thickness of less than about 500 microns. The glass fibers may be transparent and colorless or, if the glass feedstock includes doped dyes or colorants, the resulting glass fibers may also include dyes or colorants.

Figure 4:
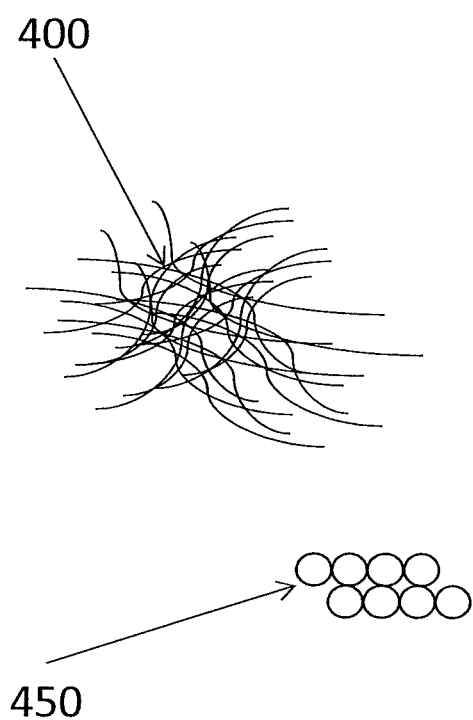
FIG. 4 illustrates an exemplary frit and fiber accordance with various aspects of the disclosure.

The methods disclosed herein may also be used to form low melting point glass frit 450 (see FIG. 4). The glass frit 450 may, in certain embodiments, have an average particle size diameter of less than about 150 microns. By way of non-limiting embodiment, the glass frit 450 may have an average particle size diameter ranging from about 100 nanometers to about 150 microns, such as less than about 125 microns, less than about 100 microns, less than about 75 microns, less than about 50 microns, less than about 10 microns, or less than about 1 micron.

Similar to the glass fibers 400, the glass frit 450 may also exhibit a $T_g$ of less than or equal to about 120% of the $T_g$ of the glass starting material (e.g., LMG feedstock). For instance, the glass frit 450 may exhibit a $T_g$ of less than or equal to about 115%, less than about 110%, less than about 105%, or less than about 100% of the $T_g$ of the glass starting material. In certain embodiments, the glass frit 450 may have a $T_g$ of less than about 250° C., for example, ranging from about 100° C. to about 250° C., such as less than about 225° C., less than about 200° C., less than about 175° C., less than about 150° C., or less than about 125° C.

According to various embodiments, the glass frit may be substantially free of lead. According to further embodiments, the glass frit is substantially lead-free, has a $T_g$ of less than about 250° C., and am average particle size diameter of less than about 150 microns. The glass frit may be transparent and colorless or, if the glass feedstock is doped with dyes or colorants, the resulting glass frit may also contain dyes or colorants.

The glass frit produced according to the methods disclosed herein may be used to form thin hermetic seals or films which may be transparent and/or translucent. The glass frit may also be environmentally desirable or "green" due to the substantial absence of lead or other EPA P-listed hazardous materials. Furthermore, the glass frit may exhibit lower $T_g$ (e.g., less than about 250° C. and, in some instances, as low as about 120° C.) and may therefore be processed at advantageously lower temperatures. Finally, the glass frit may still exhibit a high durability, for instance, when immersed in an 85° C. water-bath for 1000 hours, the glass may retain its original weight to <0.3% normalized weight.

Methods

Melt-spinning as used herein refers to any method that simultaneously melts and spins the glass feedstock. In an exemplary melt-spinning process, the glass feedstock may be rapidly and/or instantaneously melted and spun to produce long thin melted glass strands or fibers which rapidly cool, resulting in a glass wool-like composition. It is believed that such melt-spinning processes preserve the low $T_g$ of the starting materials such that the resulting glass fibers are able maintain their low melting properties during further processing, such as during the milling phase to produce low $T_g$ glass frit.

Melt-spinning of the glass feedstock may be carried out by bringing the appropriate apparatus or device into contact with the glass interface or surface. A sweeping motion away from the glass interface may, in certain embodiments, facilitate the formation of the glass fibers or strands. Various devices may be envisioned for melt-spinning the glass feedstock composition. For instance, by way of non-limiting embodiment, mentioned may be made of ceramic lathes, high rotary tools (e.g., Dremel rotary tools), and/or electro-spinning devices. In certain embodiments, a high rotary tool outfitted with a ceramic (e.g., silicon carbide) disc may be selected for melt-spinning the glass feedstock. The high rotary tool may operate at speeds of up to about 100,000 fpm, for example, ranging from about 20 fpm to about 100,000 fpm, from about 100 fpm to about 50,000 fpm, or from about 1,000 fpm to about 10,000 fpm.

Subsequent to melt-spinning, the glass fibers may be collected and fed into a jet mill for additional processing. The jet mill is capable of crushing large particle feed materials to a maximum particle size ranging from about 1 to about 5 mm. The jet mill may, in certain embodiments, operate under inert conditions. For example, the jet mill atmosphere may comprise an inert gas such as nitrogen and Noble gases, for instance, argon, helium, krypton and/or xenon. Jet-milling is often used in applications where minimal contamination is desirable because of the absence of milling media, such as those found in ball milling or similarly related attrition milling processes. However, the inventors have discovered that jet-milling is also suitable for grinding low melting point and/or thermo-sensitive materials, such as LMG compositions. Moreover, by operating the jet mill under an inert environment, it is believed that undesirable oxidation of the LMG compositions during milling can be reduced or even eliminated. In certain embodiments, such as applications withstanding modest doping, other milling processes, such as attrition milling processes (e.g., ball milling), may be used to process the glass fibers. These and other related milling processes are intended to fall within the scope and spirit of the disclosure.

The glass fibers may be fed into the jet mill in any manner suitable for processing. For instance, a vibratory feeder may be used to introduce the fibers into the jet mill. The fibers may, in certain embodiments, be swept into the crushing chamber via an air stream, such as that produced by a venturi nozzle. The accelerated airflow in the crushing chamber produces violent collisions between the particles, resulting in particle-size attrition and shearing, which reduces the fibers into crushed, superfine particles. The crushed materials can then be transported to a collector using an updraft, whereby the coarser particles can optionally be rerouted back to the crushing chamber and the finer particles can be collected and removed.

Subsequent to jet-milling, the glass frit may be optionally further processed according to methods known and used in the art. For instance, the frit may be combined with negative CTE inorganic powders and/or organic binders to form a paste. The glass frit paste may then be used to form a pattern on a suitable substrate (e.g., glass or ceramic) for binding to another substrate. The patterned substrate may be treated by organic burn-out and/or inorganic glazing steps, as well as heat and pressure treatments to bond the patterned substrate to another substrate. These and other optional processing steps can be readily envisioned by and are within the ability of one skilled in the art.

The methods disclosed herein may be especially suitable for producing doped (e.g., with dyes, colorants, phosphors, and/or quantum dots) LMG glass frit or fibers. Glass frit or fibers suitable for printing applications (e.g., screen printing, ink jet printing, and/or 3-D printing) may also be produced according to the methods disclosed herein.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a low melting point glass" includes examples having two or more such "glasses" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a glass feedstock that comprises a low melting point glass include embodiments where a glass feedstock consists of a low melting point glass and embodiments where a glass feedstock consists essentially of a low melting point glass.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

Example 1

Preparation of LMG Fibers

LMG fibers were prepared from two separate LMG (870CHM) compositions. "Single-melt" and "cullet re-melt" glasses were prepared from 870CHM, which exhibit two different glass transition temperatures due to their slight variation in composition. Single-melt 870CHM has a $T_g$ of about 114° C. and cullet re-melt 870CHM has a $T_g$ of about 132° C. The difference in glass transition temperature is believed to be related to the release of stannous fluoride during the re-melting procedure.

A Dremel high rotary tool outfitted with a silicon carbide disc rotating at about 30,000 rpm was brought to the LMG glass interface in a slow and deliberate manner and then swept away from the surface. A froth of glass wool-like fibers issued from the contact zone. The fibers were collected and analyzed by differential scanning calorimetry (DSC).

Figure 2:
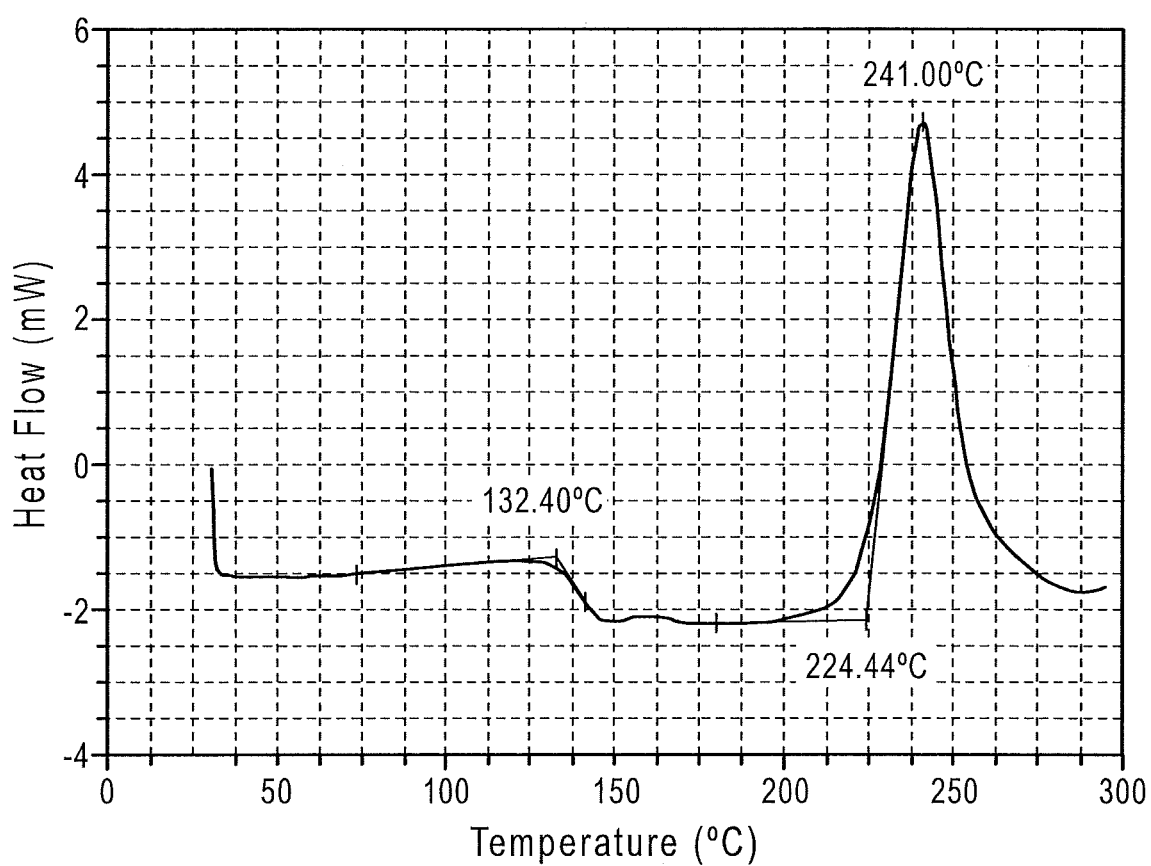
FIG. 2 illustrates the differential scanning calorimetric spectrum of LMG fibers produced from "re-melt" 870CHM glass cullet in accordance with various aspects of the disclosure.

As shown in FIG. 1, the glass fibers produced from the single-melt 870CHM retained a glass transition thermal signature almost identical to that of the parent bulk glass, with a $T_g$ of 114° C. FIG. 2 likewise illustrates that the glass fibers produced by the cullet re-melt 870CHM also retained a glass transition thermal signature almost identical to that of the parent bulk glass, with a $T_g$ of 132° C.

The 870CHM glass cullet was observed as originally having a greenish color. The glass fibers produced above were observed to be white in color. However, when re-melted at 340° C. for 1 hour to reform a glass, the greenish color of the parent bulk glass returned.

Example 2

Preparation of LMG Frit

Figure 3:
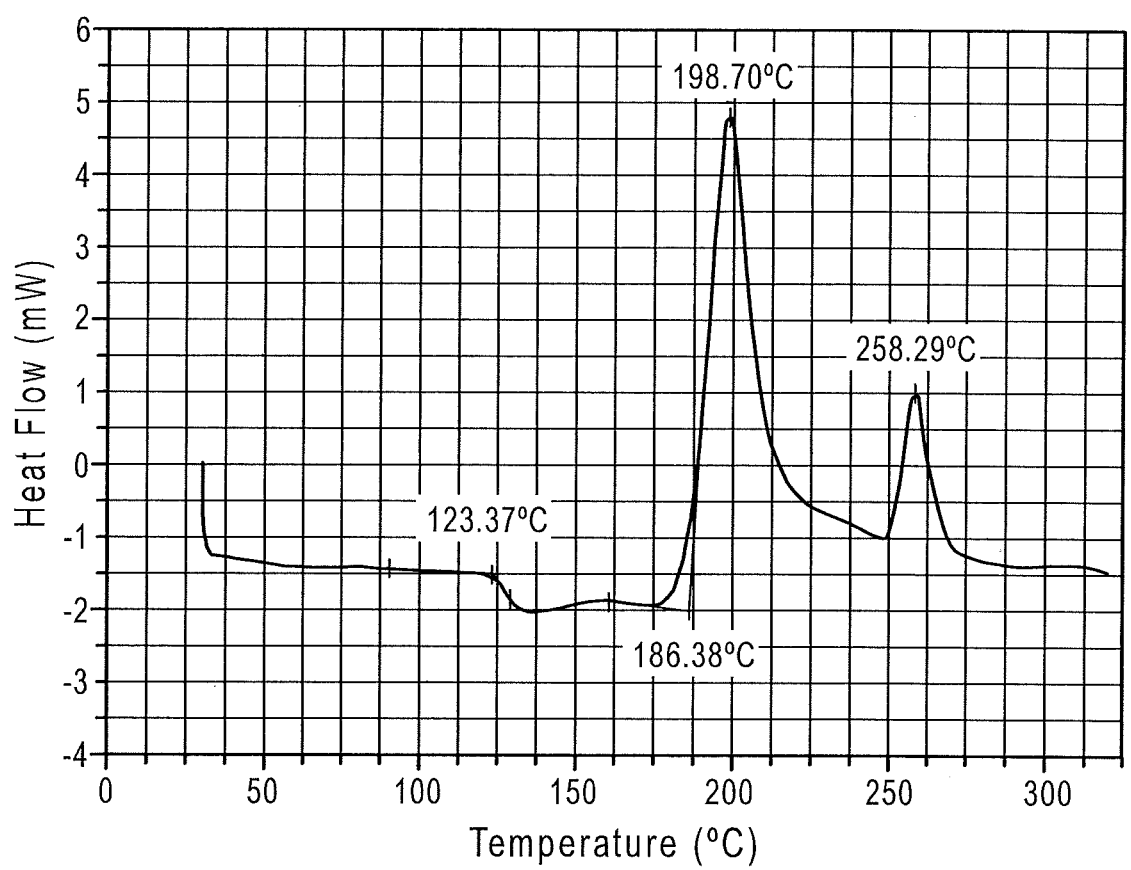
FIG. 3 illustrates the differential scanning calorimetric spectrum of LMG frit produced from "single-melt" 870CHM glass cullet in accordance with various aspects of the disclosure.

The glass fibers produced by melt-spinning the single-melt 870CHM glass composition in Example 1 were further processed by jet-milling in an inert nitrogen (>95% purity) atmosphere in accordance with the recommended manufacturing protocol. The frit was then collected and analyzed by differential scanning calorimetry (DSC). As shown in FIG. 3, the glass frit produced from the single-melt 870CHM exhibited a slight shift in the glass transition thermal signature as compared to parent bulk glass, with a $T_g$ of approximately 123° C. An additional crystallization endotherm also appeared. Although the $T_g$ of the glass frit was slightly higher than the $T_g$ of the parent bulk glass, the observed increase was only about 8%, indicating that the low melting glass properties were sufficiently retained during the overall process.

A small amount of the glass frit was suspended in an isopropanol solution by ultra-sonication and flowed through a laser scattering analyzer to characterize the particle size distribution (PSD). The results of this analysis are presented in Table I below. The PSD of the glass frit exhibited a peak at about 972 nm having a tight dispersion with a standard deviation of about 107 nm. Accordingly, the methods described herein can be used to produce LMG glass frit with relatively low particle sizes, e.g., less than about 150 microns.

TABLE I

PSD of Single-Melt 870CHM Glass Frit

| Size (nm) | % Chan | % Pass |
|---|---|---|
| 6540 | 0.00 | 100.00 |
| 5500 | 0.00 | 100.00 |
| 4620 | 0.00 | 100.00 |
| 3890 | 0.00 | 100.00 |
| 3270 | 0.00 | 100.00 |
| 2750 | 0.00 | 100.00 |
| 2312 | 0.00 | 100.00 |
| 1944 | 0.00 | 100.00 |
| 1635 | 0.00 | 100.00 |
| 1375 | 2.38 | 100.00 |
| 1156 | 36.14 | 97.62 |
| 972.0 | 53.87 | 61.48 |
| 818.0 | 7.61 | 7.61 |
| 687.0 | 0.00 | 0.00 |
| 578.0 | 0.00 | 0.00 |
| 486.0 | 0.00 | 0.00 |
| 409.0 | 0.00 | 0.00 |
| 344.0 | 0.00 | 0.00 |
| 289.0 | 0.00 | 0.00 |
| 243.0 | 0.00 | 0.00 |
| 171.9 | 0.00 | 0.00 |
| 144.5 | 0.00 | 0.00 |
| 121.5 | 0.00 | 0.00 |
| 102.2 | 0.00 | 0.00 |
| 85.90 | 0.00 | 0.00 |
| 72.30 | 0.00 | 0.00 |
| 60.80 | 0.00 | 0.00 |
| 51.10 | 0.00 | 0.00 |
| 43.00 | 0.00 | 0.00 |
| 36.10 | 0.00 | 0.00 |
| 30.40 | 0.00 | 0.00 |
| 25.55 | 0.00 | 0.00 |
| 21.48 | 0.00 | 0.00 |
| 18.06 | 0.00 | 0.00 |
| 15.19 | 0.00 | 0.00 |
| 12.77 | 0.00 | 0.00 |
| 10.74 | 0.00 | 0.00 |
| 9.03 | 0.00 | 0.00 |
| 7.60 | 0.00 | 0.00 |
| 6.39 | 0.00 | 0.00 |
| 5.37 | 0.00 | 0.00 |
| 4.52 | 0.00 | 0.00 |
| 3.80 | 0.00 | 0.00 |
| 3.19 | 0.00 | 0.00 |
| 2.690 | 0.00 | 0.00 |
| 2.260 | 0.00 | 0.00 |
| 1.600 | 0.00 | 0.00 |
| 1.130 | 0.00 | 0.00 |
| 0.950 | 0.00 | 0.00 |

Example 3

Preparation of Dye-Containing LMG Fibers

870CHM glass cullet was doped with Rhodamine-101 (0.1 g Rhodamine-101, 37.6 g $SnF_2$, 31.6 g SnO, 28.0 g $NH_4P_2O_5$, 2.96 g $Nb_2O_5$), following the general procedure described by Tick, Paul, *Old Glass Technology Revisited*, Corning Redlines, vol. 1, no. 2, pp. 1-8 (2007). The doped glass cullet was observed to be reddish in color. The cullet was subjected to the melt-spinning process described above to produce glass fibers. While the glass fibers produced from the un-doped 870CHM glass cullet were white (see Example 1), the glass fibers produced from the doped 870CHM were pinkish in color.

What is claimed is:

1. A glass comprising on an elemental weight percent basis:
   59% to 89% Sn;
   0% to 13% P;
   6% to 25% O;
   0% to 12% F;
   wherein Sn+P+O+F of the glass is at least about 75%;
   wherein the glass is substantially free of lead;
   wherein the glass comprises frit having an average particle size diameter of less than or equal to 150 microns and a glass transition temperature of less than 200° C.

2. The glass of claim 1, wherein the glass further comprises long thin melted glass strands intermixed with one another in wool-like structure and having a strand thickness of less than about 500 microns.

* * * * *

UNITED STATES PATENT AND TRADEMARK OFFICE
CERTIFICATE OF CORRECTION

PATENT NO. : 11,560,328 B2
APPLICATION NO. : 15/117954
DATED : January 24, 2023
INVENTOR(S) : Leonard Charles Dabich, II et al.

Page 1 of 1

It is certified that error appears in the above-identified patent and that said Letters Patent is hereby corrected as shown below:

On the Title Page

On the page 2, in Column 2, under "Other Publications", Line 5, delete "flourophosphate" and insert -- fluorophosphate --.

In the Claims

In Column 10, Line 35, in Claim 1, delete "Sn+P+0+F" and insert -- Sn+P+O+F --.

Signed and Sealed this
Twenty-fifth Day of July, 2023

Katherine Kelly Vidal
*Director of the United States Patent and Trademark Office*